US012583327B2

(12) United States Patent
Bunnell et al.

(10) Patent No.: US 12,583,327 B2
(45) Date of Patent: Mar. 24, 2026

(54) SYSTEM AND METHOD FOR POWER CONVERSION IN AN ELECTRICAL SYSTEM

(71) Applicant: GM GLOBAL TECHNOLOGY OPERATIONS LLC, Detroit, MI (US)

(72) Inventors: Justin Bunnell, Farmington Hills, MI (US); Yue-Yun Wang, Troy, MI (US); Jason D. Savaet, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 18/307,928

(22) Filed: Apr. 27, 2023

(65) Prior Publication Data

US 2024/0359567 A1 Oct. 31, 2024

(51) Int. Cl.
| | |
|---|---|
| *H02J 7/00* | (2006.01) |
| *B60L 15/00* | (2006.01) |
| *B60L 15/20* | (2006.01) |
| *B60L 50/60* | (2019.01) |
| *H02P 27/06* | (2006.01) |

(52) U.S. Cl.
CPC ......... *B60L 15/007* (2013.01); *B60L 15/2045* (2013.01); *B60L 50/60* (2019.02); *H02P 27/06* (2013.01); *B60L 2210/10* (2013.01); *B60L 2210/30* (2013.01)

(58) Field of Classification Search
CPC .... B60L 15/007; B60L 50/60; B60L 15/2045; B60L 2210/30; B60L 2210/10; H02P 27/06

USPC .......................................................... 318/139
See application file for complete search history.

(56) References Cited

U.S. PATENT DOCUMENTS

| | | | | |
|---|---|---|---|---|
| 10,703,218 | B2 * | 7/2020 | Duan ...................... | B60L 53/22 |
| 11,794,607 | B2 * | 10/2023 | Long ..................... | B60L 3/0046 |
| 2008/0133076 | A1 * | 6/2008 | Formanski .......... | H01M 16/006 |
| | | | | 307/64 |
| 2019/0280509 | A1 * | 9/2019 | Yokoyama ................ | H02J 7/00 |
| 2020/0039358 | A1 * | 2/2020 | Duan ...................... | B60L 50/60 |
| 2021/0152009 | A1 * | 5/2021 | Hara .................... | G01R 31/396 |
| 2023/0074308 | A1 * | 3/2023 | Namuduri ............... | B60L 58/19 |

FOREIGN PATENT DOCUMENTS

| | | |
|---|---|---|
| DE | 102014220434 A1 | 4/2016 |
| DE | 102019128412 A1 | 4/2020 |
| DE | 102021131516 A1 | 6/2023 |

* cited by examiner

*Primary Examiner* — Gabriel Agared
(74) *Attorney, Agent, or Firm* — Quinn IP Law

(57) ABSTRACT

An electrical system having a plurality of power converters each having an input in electrical communication with a power source and an output in electrical communication with a load. A controller is configured to receive an output power request for the plurality of power converters. The controller can then select at least one power converter of the plurality of power converters to satisfy the output power request based on an efficiency of power conversion of each of the plurality of power converters and an operating lifespan of each of the plurality of power converters and direct the at least one power converter to produce power to satisfy the output power request.

20 Claims, 4 Drawing Sheets

100

102

Receiving an output power request
for a multitude of power converters.

104

Selecting at least one power converter of the
multitude of power converters based on an efficiency
and lifespan of the multitude of power converters.

106

Directing the at least one power
converter to produce power to
satisfy the output power request.

SYSTEM AND METHOD FOR POWER CONVERSION IN AN ELECTRICAL SYSTEM

INTRODUCTION

Electrified powertrain systems of motor vehicles and other mobile electrical systems include an electrical system configured to energize one or more electric motors to generate motive torque. For example, an electric traction motor may be connected to the road wheels of an electric vehicle, with generated output torque being directed to the road wheels to propel the electric vehicle on a road surface. To this end, a high-voltage bus of the electric vehicle is connected to a rechargeable energy storage system ("RESS"), a principal component of which is a propulsion battery pack having an application-suitable number and configuration of electrochemical battery cells. The battery pack-to-motor connection is made through an intervening power inverter module when the electric traction motor is configured as a polyphase/alternating current ("AC") machine.

High-voltage mobile and stationary electrical powertrain systems often include a separate low-voltage bus for powering many auxiliary devices. As used herein, the terms "low-voltage" and "auxiliary voltage" encompass voltage levels of about 12-50 volts (V) or less. Exemplary auxiliary devices include internal and external lights, radios, display screens, and instrument panel gauges. Such devices are powered by the low-voltage bus, with a direct current-to-direct current ("DC-DC") voltage converter, such as an auxiliary power module, connected between the high-voltage and low-voltage buses. Because the voltage capability of the high-voltage bus greatly exceeds the nominal 12-50V auxiliary voltage levels, the auxiliary power module functions to isolate the high-voltage side of the electrical system from the low-voltage side.

SUMMARY

Disclosed herein is an electrical system including a plurality of power converters each having an input in electrical communication with a power source and an output in electrical communication with a load. A controller is configured to receive an output power request for the plurality of power converters. The controller can then select at least one power converter of the plurality of power converters to satisfy the output power request based on an efficiency of power conversion of each of the plurality of power converters and an operating lifespan of each of the plurality of power converters and direct the at least one power converter to produce power to satisfy the output power request.

Another aspect of the disclosure may be a system where the efficiency of power conversion of each of the plurality of power converters includes an efficiency corresponding to an output power at or below the output power request.

Another aspect of the disclosure may be a system where the controller is configured to select the at least one power converter based on the efficiency that results in a lowest power loss for the at least one power converter needed to satisfy the output power request.

Another aspect of the disclosure may be a system where the controller selects the at least one power converter based on the efficiency of power conversion of the at least one power converter by scaling the efficiency of power conversion with a percentage of usable life remaining for the at least one power converter.

Another aspect of the disclosure may be a system where the controller selects the at least one power converter based on the remaining useful lifespan for the at least one power converter being close to a maximum designed usable lifespan for the at least one power converter.

Another aspect of the disclosure may be a system where the at least one power converter includes at least two power converters configured to provide the output power request.

Another aspect of the disclosure may be a system where the controller selects the at least one power converter based on the operating lifespan of each of the plurality of power converters by selecting the at least one power converter with a remaining usable lifespan.

Another aspect of the disclosure may be a system where the remaining usable lifespan is defined by a remaining length of time that the at least one power converter can produce a non-zero output power.

Another aspect of the disclosure may be a system where the remaining usable lifespan is defined by a total remaining amount of energy throughput that the at least one power converter can generate.

Another aspect of the disclosure may be a system where the controller selects the at least one power converter based on the operating lifespan of each of the plurality of power converters by selecting the at least one power converter based on a remaining usable lifespan and replacement cost of the at least one power converter.

Another aspect of the disclosure may be a system where the controller selects at least one of the power converters based on the operating lifespan utilizing one of a lookup table, a continuous function, or a discreate function.

Another aspect of the disclosure may be a system where the controller selects the at least one power converter based on the operating lifespan of each of the plurality of power converters by reducing a total number of power converters operating at a given time.

Another aspect of the disclosure may be a system where the controller selects the at least one power converter based on a cost hysteresis for switching between power converters of the plurality of power converters.

Another aspect of the disclosure may be a system where the plurality of power converters are auxiliary power modules configured to perform a DC-DC power conversion.

Another aspect of the disclosure may be a system where the plurality of power converters are on-board charging modules configured to perform an AC-DC power conversion.

Another aspect of the disclosure may be a system where the at least one power converter includes at least two power converters and the controller is configured to vary an amount of power output between the at least two power converters to satisfy the output power request.

As disclosed herein, a method of operating an electrical system having a plurality of power converters. The method includes receiving an output power request for the plurality of power converters and selecting at least one power converter of the plurality of power converters to satisfy the output power request based on an efficiency of power conversion of each of the plurality of power converters and an operating lifespan of each of the plurality of power converters. Furthermore, the method includes directing the at least one power converter to produce power to satisfy the output power request.

As disclosed herein, a vehicle system includes a traction motor, a traction battery in communication with the traction motor, and a plurality of power converters each having an input in electrical communication with a power source and an output in electrical communication with a load. The system also includes a controller configured to receive an output power request for the plurality of power converters and select at least one power converter of the plurality of power converters to satisfy the output power request based on an efficiency of power conversion of each of the plurality of power converters and an operating lifespan of each of the plurality of power converters. Furthermore, the controller is configured to direct the at least one power converter to produce power to satisfy the output power request.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Figure 1:
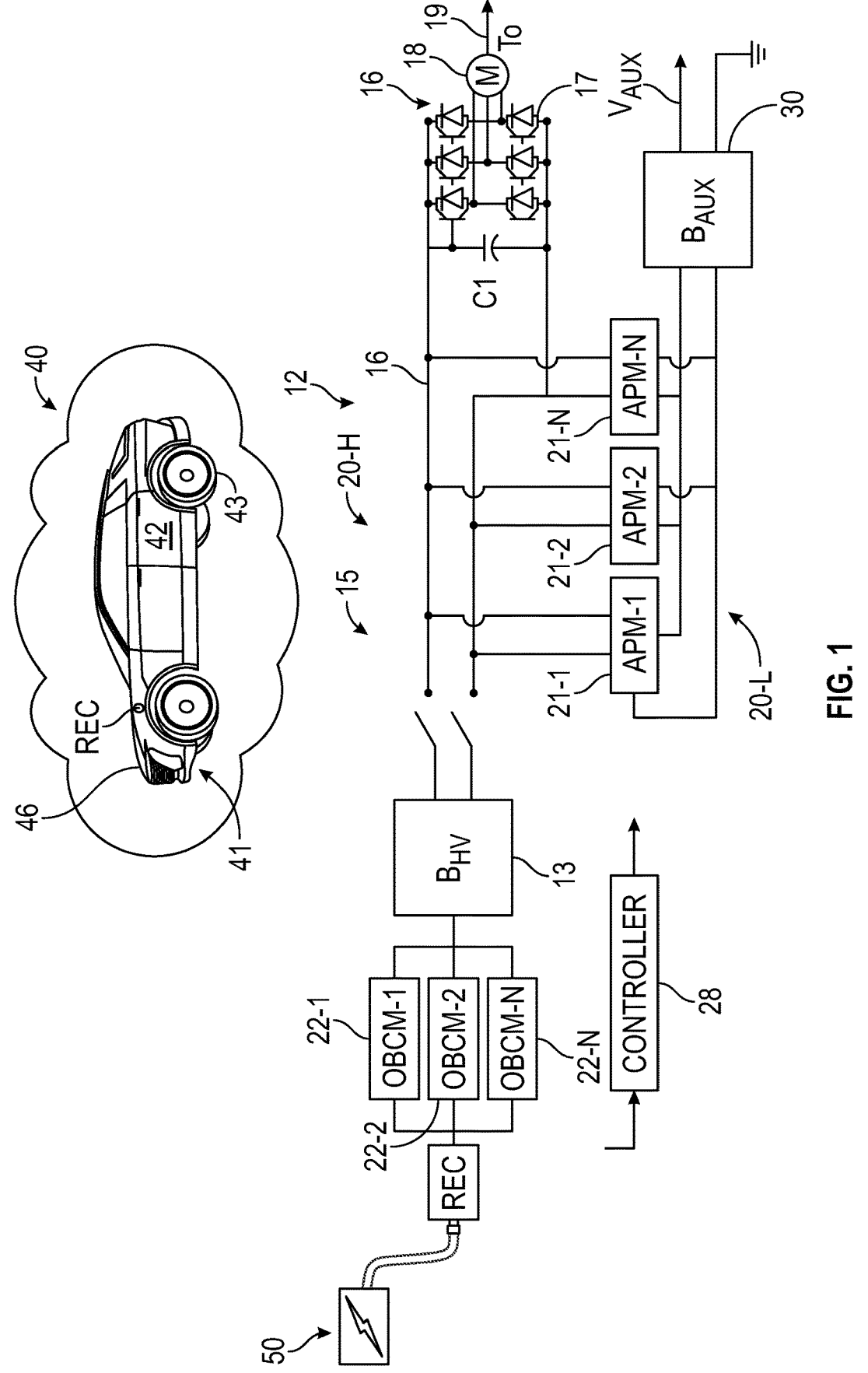
FIG. 1 illustrates an example electrical system configured to charge a high-voltage battery pack with the high-voltage battery pack configured to provide power to a low-voltage bus.

Referring to the drawings, like reference numerals correspond to like or similar components throughout the several Figures. FIG. 1 illustrates an electrical system 12, e.g., an electrified powertrain system of a motor vehicle 40 having a vehicle body 41 defining a vehicle interior 42. The motor vehicle 40 of FIG. 1 may also include a front trunk ("frunk") 46 or another compartment providing user access to a charging receptacle REC. The motor vehicle 40 also includes road wheels 43 for traveling along roadways. The wheels 43 may be driven/powered through the electrical system 12 or undriven/freewheeling, as described in greater detail below.

The electrical system 12 includes separate high-voltage and low-voltage buses. The high-voltage bus 20-H is in electrical communication with a high-voltage battery pack 13, such as a traction battery, and the low-voltage bus 20-L is in electrical communication with an auxiliary battery ("B$_{AUX}$") 30. At least two or more on-board charging modules ("OBCMs") 22-1, 22-2, and 22-N include inputs in communication with the charging receptacle REC as power converters to convert an AC power source from a charge station 50 to DC power at an outlet to charge the battery pack 13. At least two or more auxiliary power modules ("APMs") 21-1, 21-2, 21-N isolate the high-voltage bus 20-H from the low-voltage bus 20-L with input in communication with the high-voltage bus 20-H and outputs in communication with the low-voltage bus 20-L to charge the auxiliary battery 30 and power vehicle accessories, such as heated seats, power windows, or navigation systems. The OBCMs 22 and APMs 21 are both in communication with an electronic controller 28 in the electrical system 12.

The electronic controller 28 may include a computer and/or processor, and include software, hardware, memory, algorithms, connections, etc., for managing and controlling the operation of the motor vehicle 40. As such, a method, described below and generally represented in FIG. 5, may be embodied as a program or algorithm partially operable on the controller 28. It should be appreciated that the controller 28 may include a device capable of analyzing data from the sensors, comparing data, making the decisions required to control the operation of the motor vehicle 40, and executing the required tasks to control the operation of the motor vehicle 40.

The controller 28 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The controller 28 includes a tangible, non-transitory memory on which computer-executable instructions, including one or more algorithms, are recorded for regulating operation of the motor vehicle 40. The subject algorithm(s) may specifically include an algorithm configured to optimize energy usage of the motor vehicle 40.

In the illustrated example, features and functions of the power converters, such as the auxiliary power modules 21-1, 21-2, 21-N or the on-board charge modules 22-1, 22-2, 22-N of FIG. 1, may be partially or fully integrated into the structure of the electrical system 12. Moreover, the present teachings apply to a wide range of mobile and stationary variations of the electrical system 12, including but not limited to electrified powertrain systems of aircraft, marine vessels, railed vehicles, farm equipment, transport equipment, and other land, sea, or airborne mobile platforms, as well as powerplants, hoists, conveyor systems, and the like. The descriptions herein of the particular vehicular use scenario shown in FIG. 1 are, therefore, non-limiting and illustrative of just one possible implementation.

Further, concerning the representative electrical system 12 of FIG. 1, the electrical system 12 is characterized by its separate high-voltage and low-voltage buses which are respectively labeled "20-H" and "20-L". For embodiments in which the electrical system 12 is part of the motor vehicle 40, e.g., an electric vehicle constructed as a battery electric vehicle, a hybrid electric vehicle, or an extended-range electric vehicle, the term "high-voltage" may encompass battery voltage capabilities of about 300 volts (V) or more. Such voltage levels are suitable for generating motive torque for vehicular propulsion functions and for powering various high-voltage accessories aboard the motor vehicle 40. The term "low-voltage" for its part refers to auxiliary voltage levels, typically 12-50V. Low-voltage conductors (not shown) thus connect the low-voltage bus 20-L to one or more low-voltage accessories located aboard the motor vehicle 40, including but not limited to lights, radios, infotainment screens, sensors, etc.

In the exemplary embodiment of FIG. 1, the battery pack 13 is selectively connected to and disconnected from a load by a set of high-voltage contactors 15. The applied load in the illustrated configuration includes a DC link capacitor (C1), a power inverter module ("inverter") 16 having a plurality of semiconductor switches 17 connected to an electric traction motor ("M") 18. As appreciated in the art, inverters such as the inverter 16 shown in FIG. 1 utilize multiple dies of the semiconductor switches 17 as fast-responding ON/OFF switching devices, e.g., insulated gate bipolar transistors ("IGBTs"), metal oxide semiconductor field-effect transistors ("MOSFETs"), thyristors, etc. In a typical three-phase configuration of the electric traction motor 18, the semiconductor switches 17 are turned ON or OFF at predetermined switching intervals to output an alternating current ("AC") waveform to the electric traction motor 18.

The electric traction motor 18 shown in FIG. 1 is connected to a rotatable output member 19, such as a motor shaft and connected gears (not shown). During drive modes, the inverter 16 is controlled with pulse width modulation ("PWM") or another application-suitable switching control technique to energize phase windings of the electric traction motor 18. As depicted, the electric traction motor 18 is a polyphase AC motor, in this instance exemplified as a three-phase machine. Rotation of the output member 19 ultimately transfers torque (To) to a coupled load, including one or more road wheels 43 of the motor vehicle 40. During discharge/propulsion modes, electrical energy stored in constituent electrochemical battery cells (not shown) of the high-voltage battery pack 13 is used to power rotation of one or more of the road wheels 43. Other embodiments of the motor vehicle 40 may use more or fewer road wheels 43. Additionally, some of the road wheels 43 could be undriven/ freewheeling, e.g., in rear-wheel drive or front-wheel drive configurations, or the road wheels 43 may be driven/powered, e.g., in an all-wheel drive or four-wheel drive configuration, without limitation.

The electrical system 12 of FIG. 1 may also include additional components for powering various systems or functions aboard the motor vehicle 40. For example, the battery pack 13 as depicted is connected to the APMs 21-1, 21-2, 21-N. As such, the APMs 21-1, 21-2, 21-N are operable to reduce a level of a DC voltage of the high-voltage bus 20-H, e.g., 300V or more as noted above, to a typical 12-50V auxiliary voltage level for the low-voltage bus 20-L. The auxiliary battery 30, such as a 12V/48V lead-acid or lithium auxiliary battery, may be electrically connected to the APMs 21-1, 21-2, 21-N, with internal switching operation of the APMs ensuring that the auxiliary battery 30 remains charged, i.e., that the auxiliary battery voltage ($V_{AUX}$) equals about 12-50V.

To meet the output power requests for the electrical system 12 on the motor vehicle 40 received by the controller 28, multiple power converters of a given type, such as APMs or OBCMs, may be required. For example, when the output power request is for low-voltage DC power, more than one of the APMs 21-1, 21-2, or 21-N may be needed at a given time to satisfy the output power request for the low-voltage bus 20-L. Similarly, when the output power request is for high-voltage DC power, more than one of the OBCMs 22-1, 22-2, or 22-N may be needed at a given time to satisfy the output power request for charging the battery pack 13.

One feature of this disclosure is to improve the power conversion efficiency of an electrical system when the power conversion can occur on one or more power converters, such as OBCMs or APMs. The power converters can include the same maximum rated power output and efficiency or have varying maximum rated power output and efficiency. This disclosure also includes the feature of extending the operating lifespan of the electrical system 12 through selectively operating different combinations of power converters at a given time. This reduces operating costs associated with the electrical system and increases service intervals needed to maintain the electrical system 12. This disclosure accomplishes the above-identified features by selecting at least one of the power converters based on efficiency and lifespan of the power converters to satisfy the output power request for different types of power converters in the electrical system 12.

In one example, the above-noted features are accomplished through minimizing a cost equation based on efficiency ($\eta$) and lifespan of the power converters. Equation (1) below illustrates an example cost equation that can be minimized to improve efficiency and lifespan of power converters in the electrical system 12.

$$\sum_{i=1}^{N}\left(\text{Output}\,Power_i * \left(\frac{1}{Efficiency_i} - 1\right) + \right. \tag{1}$$

$$f_{2i}(\text{Usable Life Remaining of } PC_i, \text{Output } Pwr \text{ of } PC_i) +$$

$$\left. f_{3i}(\text{Output } Pwr \text{ of } PC_i)\right)$$

The example Equation (1) above assigns real or artificial costs in terms of Watts for operating one or more power converters $PC_i$ at a given output power that collectively sum to equal the output power request for the APMs or OBCMs. The real costs are calculated from actual power loss from operating a given power converter $PC_i$ at a given output power based on its efficiency and the artificial costs are calculated by quantifying an impact on lifespan of the electrical system 12 from operating one or more power converters at a given time.

Figure 2:
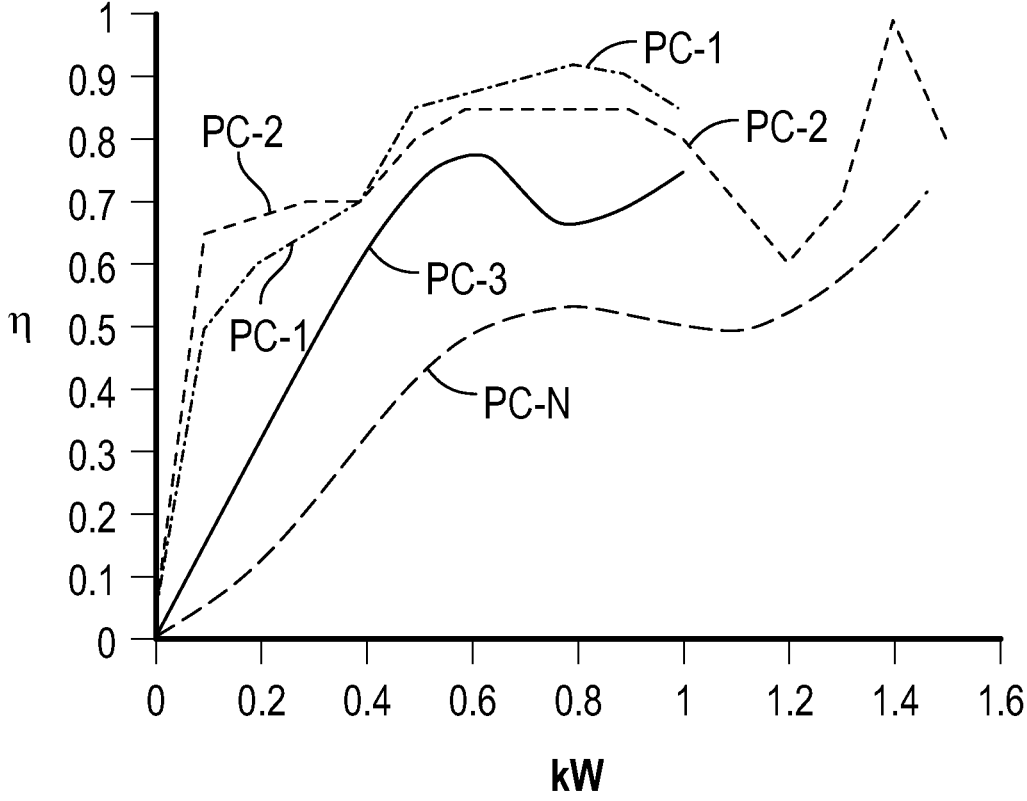
FIG. 2 illustrates an example chart of output power (kW) versus efficiency (n) for multiple example power converters.

The first line of Equation (1) calculates a cost in Watts for operating one of the power converters at a given output power that either by itself or collectively with other power converters satisfy the output power request for the electrical system 12. FIG. 2 illustrates efficiencies ($\eta$) for the power converters PC-1, PC-2, PC-3 through PC-N can vary based on a specific output power generated by the power converter. For example, for output power less than 400 W, power converter PC-1 is less efficient than power converter PC-2. Conversely, power converter PC-1 is more efficient when the output power is between 400 W and 1000 W than power converter PC-2.

Equation (1) utilizes the efficiency values shown in FIG. 2 when calculating a cost for the power converter at a specific output power. For example, FIG. 2 provides an efficiency value of approximately 0.90 or 90% at 800 W for PC-1 and approximately 0.85 or 85% at 800 W for PC-2. This generates a cost in terms of efficiency of 88.9 W to operate the power converter PC-1 at 800 W and a cost of 141.2 W to operate the power converter PC-2 at 800 W. Therefore, based on these costs of operation at 800 W of output power, the controller 28 would select power converter PC-1 over power converter PC-2 because PC-1 had a lower cost at 800 W compared to PC-2. Because the controller 28 in this disclosure can individually regulate the conversion and load in the electrical system 12, the controller 28 can select the power converter(s) with the greatest efficiency to minimize power losses associated with the power conversion through optimizing the system in this way. The controller 28 can also apply a calibration factor $K_1$ to the first line of Equation (1) to vary weight of the efficiency in making its selection.

One feature of the controller 28 is the ability to individually select power converters at a given output power to minimize power consumed from an energy source, such as the battery pack 13 for the APMs 21 or the charge station 50 for the OBCMs 22. Because the controller 28 can provide a supervisory control that commands a current/power level to each power converter in the electrical system 12 in a manner that maintains a maximum number of power converters in their optimum power conversion efficiency range, the electrical system will minimize the overall energy losses due to conversion inefficiency. The benefits of the controller 28 performing a supervisory function as described herein can increase an available range for the motor vehicle 40 by directing more power towards propulsion by reducing power conversion efficiency losses.

Furthermore, the controller 28 can limit a peak output power for the power converter $PC_i$. In particular, the controller 28 can limit peak power based on a remaining useful lifespan for the power converter $PC_i$ when the remaining useful lifespan for power converter $PC_i$ is close to the maximum designed usable lifespan for the power converter $PC_i$. Useful lifespan can be defined by total hours of operation or total energy throughput.

In another example, the controller 28 can bias the electrical system 12 towards using less than a total number of power converters N through modifying the first line of Equation (1) to sum across M power converters instead of N power converters. The controller 28 biases the electrical system 12 towards using less than the total number of power converters N by restricting M to an integer greater than 0 and less than or equal to N. The controller 28 can also vary the value of M based on overall electrical system age and output power requests.

The function $f_{2i}$ in Equation (1) generates an artificial cost in Watts associated with operating a given power converter $PC_i$ based on a remaining lifespan of the given power converter $PC_i$. Equation (2) below illustrates one example equation for quantifying lifespan for the function $f_{2i}$ in Equation (1).

$$f_{2i} = X_i * K_2 * \frac{\text{Hrs of Life Utilized } PC_i}{\text{Max Designed Life } PC_i} \quad (2)$$

Equation (2) quantifies lifespan for the power converter $PC_i$ in terms of hours of life utilized for the power converter $PC_i$ over a maximum designed usable life for the power converter $PC_i$ in terms of hours. In Equation (2), $X_i$ is a function of output power for the power converter $PC_i$ with $X_i$ equal to 1 if the power converter $PC_i$ has a non-zero output power and with $X_i$ equal to zero if the power converter $PC_i$ has zero output power.

Also, $K_2$ is a calibration factor that scales the cost of using the given power converter $PC_i$ near the end of maximum designed usable life (e.g., hours of operation). The calibration factor $K_2$ is in terms of Watts to maintain the function $f_{2i}$ in terms of Watts. Additionally, in one example, a value of $K_2$ can include a single constant value for the power converters $PC_i$.

In another non-limiting example, $K_2$ is a unique constant $K_i$ for a given power converter $PC_i$. The value $K_i$ can capture other information regarding the lifespan of the given power converter $PC_i$, such as relative costs of the power converters $PC_i$ in the electrical system 12. For example, a value of $K_i$ could represent a replacement cost (e.g., component and installation cost) for the power converter $PC_i$. Therefore, a power converter with a higher replacement cost would have a calibration factor $K_i$ that is greater than a calibration factor $K_x$ for a power converter with a lower replacement cost to bias the electrical system 12 towards using the power converter with a lower replacement cost. The controller 28 can also obtain values for the calibration factors through a lookup table of predetermined values for power converters or the controller 28 can calculate a unique calibration factor for a power converter given inputs on the replacement costs associated with replacing that power converter.

The controller 28 utilizes the function $f_{2i}$ to bias the electrical system 12 towards not running individual power converters in a multiple power converter system that are approaching an end of a predetermined operating lifespan for a given power converter. Avoiding the use of power converters approaching an end of its predetermined operating lifespan more evenly distributes power conversion across the plurality of power converters in the electrical system 12 to extend the operating life of the electrical system 12 in the motor vehicle 40.

In another example, the function $f_{2i}$ can be calculated based on energy throughput for the power converter $PC_i$ as shown in Equation (3) instead of based on hours with Equation (2). Equation (3) quantifies lifespan for the power converter $PC_i$ based on a total amount of energy throughput for the power converter $PC_i$ over a maximum designed operating lifespan of energy throughput for the power converter $PC_i$. In one example, the terms $X_i$ and $K_2$ for Equation (3) are calculated in the same manner as discussed above with respect to Equation (2). In another example, $X_i$ could be equal to the output power of $PC_i$ in Watts with $K_2$ being a unitless constant.

$$f_{2i} = X_i * K_2 * \frac{\text{Total Energy Throughput } PC_i}{\text{Max Designed Energy Throughput } PC_i} \quad (3)$$

Furthermore, while the disclosure provides example Equations (2) and (3) for calculating the function $f_{2i}$ in Equation (1), a value for function $f_{2i}$ could be determined by the controller 28 from a lookup table, a continuous function, or a discrete function.

In another non-limiting example, the controller 28 can combine or scale the calculation based on efficiency from the first line of Equation (1) with the function $f_{2i}$ for lifespan. Equation (4) below illustrates an example implementation of this approach.

$$\sum_{i=1}^{N}\left(\text{Output } Power_i * f_{2i}(ULR \text{ of } PC_i, OP \text{ of } PC_i) * \left(\frac{1}{Efficiency_i} - 1\right)\right) \quad (4)$$

$$\sum_{i=1}^{N}\left(Output \ Power_i * f_{2i}(ULR \text{ of } PC_i, OP \text{ of } PC_i) * \left(\frac{1}{Efficiency_i} - 1\right)\right)$$

Equation (4) above scales the calculation for efficiency of the power converter $PC_i$ by multiplying the value for efficiency taken from FIG. 2 by the value representing the remaining predetermined lifespan for the power converter $PC_i$ from Equations (2) or (3). This approach will bias the controller 28 away from using power converters with a high efficiency and a small remaining predetermined operating lifespan towards using a power converter with a lower efficiency and a larger remaining predetermined operating lifespan. One feature of this approach is to create a balanced use of power converters in the electrical system 12.

The function $f_{3i}$ in Equation (1) generates a cost associated with operating multiple power converters at the same time and its impact on overall system lifespan of the power converters in the electrical system 12. Equation (5) below illustrates one example function for quantifying lifespan for the function $f_{3i}$ in Equation (1).

$$f_{3i} = K_3 * X_i \quad (5)$$

In Equation (5), $X_i$ is a function of output power for the power converter $PC_i$ with $X_i$ equal to 1 if the power converter $PC_i$ has a non-zero output power and with $X_i$ equal to zero if the power converter $PC_i$ has zero output power. Also, calibration factor $K_3$ in Equation (5) assigns a cost for operating multiple power converters at the same time. Operating multiple power converters at the same time results in the overall system of a given type of power converters, such as the APMs or OBCMs, reaching its system predetermined operating lifespan sooner. The calibration factor $K_3$ is in units of Watts of power to provide common units with the remainder of Equation (1).

One feature of having the controller 28 implement the function $f_{3i}$ is to manage the lifespan of N power converters of a given type as opposed to managing lifespan based on individual power converters with the function $f_{2i}$. The function $f_{3i}$ also biases the controller 28 towards reducing a total number of operating power converters as the calibration factor $K_3$ is multiplied by the total number of power converters with a non-zero power output as discussed above.

The function $f_{3i}$ manages the overall power converter system lifespan by assigning a cost on running more than one power converter at once. Based on this function, the controller 28 biases the electrical system 12 towards running fewer power converters at a given time. This reduces the total number of hours of power converter operation across a given type of power converter in the electrical system 12 which increases lifespan and prevents premature failure of a single power converter in an electrical system with multiple power converters.

In another example, the cost associated with $f_{3i}$ could be defined in broader terms with a unique cost being assigned based on a sum of the values $X_i$ for N power converters.

Alternatively, the controller 28 could utilize a lookup table to assign a calibratable cost for a possible value for the sum of the values $X_i$ for N power converters. Furthermore, for the function $f_{3i}$, the controller 28 could apply a function, such as $K_3$ multiplied by a square of the sum of the values $X_i$ for N power converters, to bias the controller 28 away from selecting multiple power converters.

The controller 28 can also prevent rapid switching between power converter states while satisfying the output power request by applying a cost hysteresis, such as through the example Equation (6) below.

$$\text{Minimum } Cost_{t-1} - \text{Minimum } Cost_t > Cost_{Hysteresis} \quad (6)$$

For an electrical system with N power converters of a given type, Equation (1) above could be minimized every 100 ms. The above Equation (6) identifies the optimized cost from Equation (1) associated with a current time step as Minimum $Cost_t$ and the optimized cost associated with the previous time step as Minimum $Cost_{t-1}$. Equation (6) also assumes that the output power request of the current time step and previous time step are equal.

With these assumptions, a cost hysteresis $Cost_{Hysteresis}$ can be defined as a calibratable value to balance power converter efficiency and lifespan with system stability. With Equation (6), the controller 28 can select the power converter utilization specified by Minimum $Cost_t$. Otherwise, the controller 28 can select the power converter utilization specified by Minimum $Cost_{t-1}$ and set Minimum $Cost_t$=Minimum $Cost_{t-1}$.

Figures 3, 4:
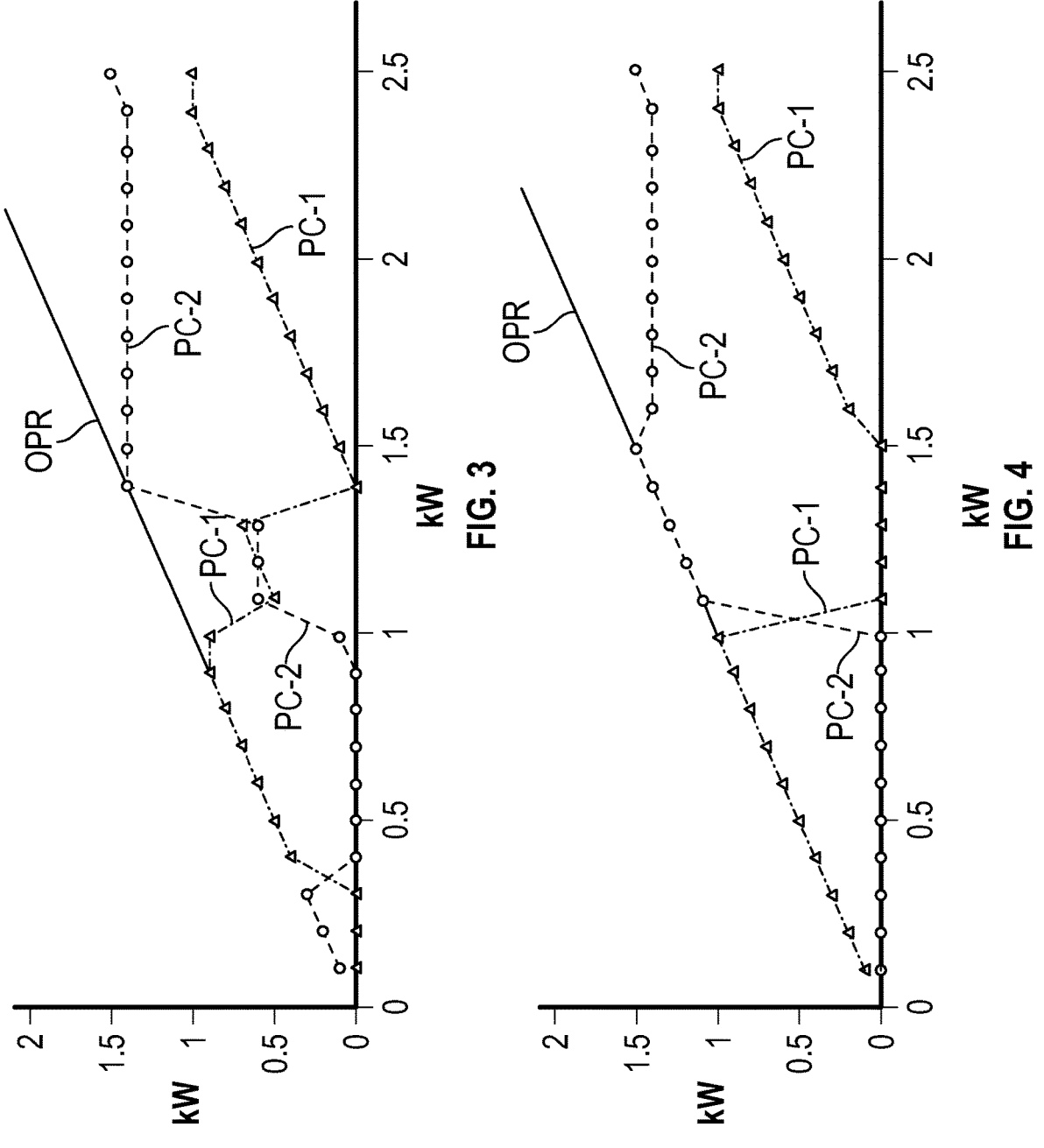
FIG. 3 is a chart illustrating example power outputs for power converters of the electrical system of FIG. 1 having efficiencies as illustrated in FIG. 2 and optimized according to a first set of parameters for satisfying a given output power request.
FIG. 4 is a chart illustrating the example power outputs for the power converters of the electrical system of FIG. 1 having the efficiencies as illustrated in FIG. 2 and optimized according to a second set of parameters for satisfying the given output power request.

FIGS. 3 and 4 illustrate example implementations of the controller 28 implementing Equation (1) for an electrical system 12 with two power converters at varying output power requests. Equation (7) below illustrates an example implementation of Equation (1) with two power converters.

$$K_1 * \left(\text{Output } Power_1 * \left(\frac{1}{\eta_1} - 1\right) + \text{Output } Power_2 * \left(\frac{1}{\eta_2} - 1\right)\right) + \quad (7)$$

$$K_2 * \left(X_1 * \frac{\text{Hrs of Life Utilized } PC_1}{\text{Max Designed Life } PC_1} + \right.$$

$$\left. X_2 * \frac{\text{Hrs of Life Utilized } PC_2}{\text{Max Designed Life } PC_2}\right) + (X_1 + X_2) * K_3$$

In the example shown in FIG. 3, the power converter PC-1 has a maximum power output of 1000 W and has utilized 10% of its usable life. The power converter PC-2 has a maximum power output of 1500 W and has utilized 50% of its usable life. The value for $K_1$ is one, and the values for $K_2$ and $K_3$ are zero kW. The efficiencies of the power converters PC-1 and PC-2 at given power outputs are obtained from FIG. 2. Because the values of $K_2$ and $K_3$ are zero kW in this example, the controller 28 selects the most efficient allocation of power across both power converters to produce the output power request with the sum of output power for the power converters PC-1 and PC-2 equal to the output power request at line OPR.

FIG. 4 illustrates an example where the controller 28 is biased away from selecting a power converter that has utilized a greater percentage of its maximum designed lifespan. This biasing behavior is quantified by the calibration factor $K_2$ being 999 KW. The value for $K_2$ was changed from the example of FIG. 3. As shown in FIG. 4, this change directs the controller 28 to select the power converter PC-1 for a power output request up to 1 kW even though the power converter PC-2 has a greater efficiency for output power requests up to 400 W.

Figure 5:
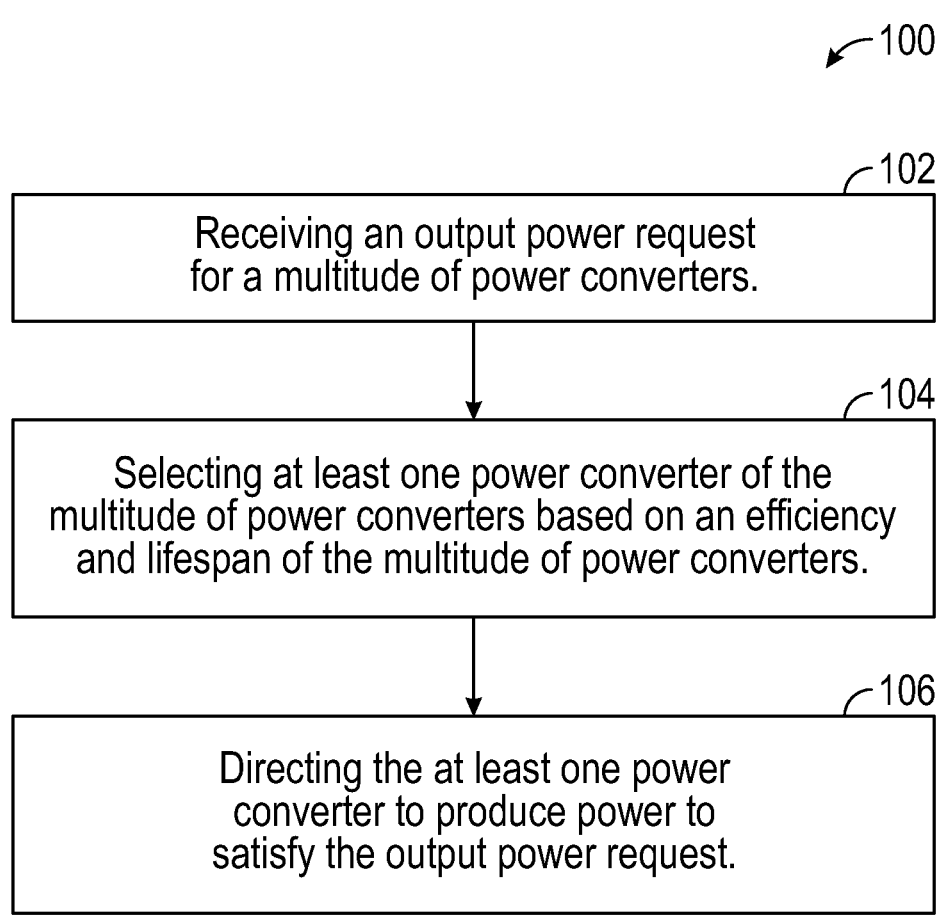
FIG. 5 illustrates a method of operating the electrical system of FIG. 1 with a plurality of power converters.

FIG. 5 illustrates an example method 100 according to this disclosure for operating an electrical system having a plurality of power converters. The method 100 includes receiving an output power request for the plurality of power converters (Block 102). In one example, the output power request received by the controller 28 provides a supervisory control that commands a current/power level to each power converter 21, 22 in the electrical system 12 in a manner that maintains power converters in their optimum power conversion efficiency range.

The controller 28 can then select at least one power converter from the plurality of power converters to satisfy the output power request (Block 104). The controller 28 bases the power converter selection on the efficiency of power conversion of the plurality of power converters at a given output power and an operating lifespan of the plurality of power converters. Equation (1) above provides one example approach for the controller 28 to base the selection of the at least one power converter on efficiency and lifespan of the plurality of power converters. When the controller 28 bases its selection on efficiency of power conversion of the at least one power converter, the efficiency can include an efficiency of the at least one power converter at or below the output power request.

Once the controller 28 has selected the at least one power converter, the controller 28 directs the at least one power converter to produce the output power needed to satisfy the output power request (Block 106). When more than one power converter is used to satisfy the output power request, the output power of the individual power converters can vary from each other to maximize efficiencies as discussed above.

Accordingly, this disclosure provides an approach to operating an electrical system 12 that can improve the efficiency of the power converters and maintain a balanced utilization of the lifespan of each of the power converters to maximize the overall lifespan of the electrical system 12. With the electrical system 12 incorporated into the motor vehicle 40, this will increase a vehicle's range by allowing more energy to be used for propulsion than lost to energy conversion while also maximizing the longevity of the electrical system's ability to convert power.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An electrical system comprising:
a plurality of power converters each having an input in electrical communication with a power source and an output in electrical communication with a load; and
a controller configured to:
receive an output power request for the plurality of power converters;
select at least one power converter of the plurality of power converters to satisfy the output power request power converters to satisfy the output power request based on an efficiency of power conversion of each of the plurality of power converters and an operating lifespan of each of the plurality of power converters having a remaining usable lifespan based on utilizing one of a lookup table, a continuous function, or a discreate function; and
direct the at least one power converter to produce power to satisfy the output power request.

2. The electrical system of claim 1, wherein the controller selects the at least one power converter based on the efficiency of power conversion of the at least one power converter by scaling the efficiency of power conversion with a percentage of usable life remaining for the at least one power converter.

3. The electrical system of claim 1, wherein the controller selects the at least one power converter based on the remaining useful lifespan for the at least one power converter being close to a maximum designed usable lifespan for the at least one power converter.

4. The electrical system of claim 1, wherein the at least one power converter includes at least two power converters configured to provide the output power request.

5. The electrical system of claim 1, wherein the remaining usable lifespan is defined by a remaining length of time that the at least one power converter can produce a non-zero output power.

6. The electrical system of claim 1, wherein the remaining usable lifespan is defined by a total remaining amount of energy throughput that the at least one power converter can generate.

7. The electrical system of claim 1, wherein the controller selects the at least one power converter based on the operating lifespan of each of the plurality of power converters by selecting the at least one power converter based on a remaining usable lifespan and replacement cost of the at least one power converter.

8. The electrical system of claim 1, wherein the controller selects the at least one power converter based on the operating lifespan of each of the plurality of power converters by reducing a total number of power converters operating at a given time.

9. The electrical system of claim 1, wherein the controller selects the at least one power converter based on a cost hysteresis for switching between power converters of the plurality of power converters.

10. The electrical system of claim 1, wherein the plurality of power converters are auxiliary power modules configured to perform a DC-DC power conversion.

11. The electrical system of claim 1, wherein the plurality of power converters are on-board charging modules configured to perform an AC-DC power conversion.

12. The electrical system of claim 1, wherein the at least one power converter includes at least two power converters and the controller is configured to vary an amount of power output between the at least two power converters to satisfy the output power request.

13. The electrical system of claim 1, wherein the efficiency of power conversion of each of the plurality of power converters includes an efficiency corresponding to an output power at or below the output power request.

14. The electrical system of claim 13, wherein the controller is configured to select the at least one power converter based on the efficiency that results in a lowest power loss for the at least one power converter needed to satisfy the output power request.

15. A method of operating an electrical system having a plurality of power converters, the method comprising:
receiving an output power request for the plurality of power converters;

selecting at least one power converter of the plurality of power converters to satisfy the output power request based on an efficiency of power conversion of each of the plurality of power converters and an operating lifespan of each of the plurality of power converters having a remaining usable lifespan based on utilizing one of a lookup table, a continuous function, or a discreate function; and directing the at least one power converter to produce power to satisfy the output power request.

16. The method of claim 15, wherein selecting the at least one power converter based on the efficiency of power conversion includes selecting the at least one power converter with a greatest efficiency of power conversion at or below the output power request.

17. The method of claim 15, wherein selecting the at least one power converter based on the operating lifespan includes selecting the at least one power converter with a largest remaining usable life.

18. The method of claim 15, wherein the remaining usable lifespan is based on a replacement cost of the at least one power converter.

19. A vehicle system comprising:

a traction motor;

a traction battery in communication with the traction motor;

a plurality of power converters each having an input in electrical communication with a power source and an output in electrical communication with a load; and a controller configured to:

receive an output power request for the plurality of power converters;

select at least one power converter of the plurality of power converters to satisfy the output power request based on an efficiency of power conversion of each of the plurality of power converters and an operating lifespan of each of the plurality of power converters having a remaining usable lifespan based on utilizing one of a lookup table, a continuous function, or a discreate function; and direct the at least one power converter to produce power to satisfy the output power request.

20. The vehicle system of claim 19, wherein the remaining usable lifespan is based on a replacement cost of the at least one power converter.

* * * * *